US010661711B2

(12) United States Patent
Ohtani et al.

(10) Patent No.: US 10,661,711 B2
(45) Date of Patent: May 26, 2020

(54) WARNING OUTPUT DEVICE

(71) Applicant: TOYOTA JIDOSHA KABUSHIKI KAISHA, Toyota-shi, Aichi-ken (JP)

(72) Inventors: Shinya Ohtani, Toyota (JP); Masato Okuda, Okazaki (JP); Akihiro Kida, Toyota (JP); Yuka Takagi, Nagoya (JP); Toshihiro Takagi, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 80 days.

(21) Appl. No.: 15/845,577

(22) Filed: Dec. 18, 2017

(65) Prior Publication Data

US 2018/0178720 A1    Jun. 28, 2018

(30) Foreign Application Priority Data

Dec. 27, 2016    (JP) .................................. 2016-252222

(51) Int. Cl.
*B60Q 9/00*    (2006.01)
*G08G 1/04*    (2006.01)
(Continued)

(52) U.S. Cl.
CPC .............. *B60Q 9/008* (2013.01); *B60K 35/00* (2013.01); *G08G 1/04* (2013.01); *G08G 1/166* (2013.01); *B60K 2370/152* (2019.05); *B60K 2370/157* (2019.05); *B60K 2370/173* (2019.05); *B60K 2370/178* (2019.05); *B60K 2370/179* (2019.05);
(Continued)

(58) Field of Classification Search
CPC .. B60Q 9/008; B60K 35/00; B60K 2370/152; B60K 2370/173; B60K 2370/186; B60K 2370/193; B60K 2370/21; B60K 2370/179; G08G 1/04; G08G 1/166
See application file for complete search history.

(56) References Cited

U.S. PATENT DOCUMENTS

2002/0128754 A1    9/2002  Sakiyama et al.
2007/0144261 A1    6/2007  Okuda et al.
(Continued)

FOREIGN PATENT DOCUMENTS

JP    2001191877 A    7/2001
JP    2003246250 A    9/2003
(Continued)

*Primary Examiner* — Aaron L Troost
(74) *Attorney, Agent, or Firm* — Hunton Andrews Kurth LLP

(57) ABSTRACT

A warning output device includes a rear sensor unit and an electronic control unit. The electronic control unit is configured to, when a shift position is an R range, based on information from the sensor unit indicating that a first obstacle is detected, output a warning for informing an occupant of the presence of the first obstacle, in a first state, output first predetermined warning display and first predetermined warning sound; and in a second state, output second predetermined warning display and second predetermined warning sound. The ECU is configured to, in the second state, output the second predetermined warning sound for a predetermined time, then stop the output of the second predetermined warning sound, and output the second predetermined warning display for a longer time than the second predetermined warning sound.

8 Claims, 12 Drawing Sheets

(51) Int. Cl.
*G08G 1/16* (2006.01)
*B60K 35/00* (2006.01)

(52) U.S. Cl.
CPC .. *B60K 2370/186* (2019.05); *B60K 2370/193* (2019.05); *B60K 2370/21* (2019.05); *B60K 2370/48* (2019.05)

(56) References Cited

U.S. PATENT DOCUMENTS

| | | | | |
|---|---|---|---|---|
| 2008/0167781 | A1* | 7/2008 | Labuhn | B60W 30/08 |
| | | | | 701/48 |
| 2012/0026011 | A1 | 2/2012 | Yamashita | |
| 2016/0355131 | A1* | 12/2016 | Murasumi | B60Q 9/008 |
| 2018/0009378 | A1* | 1/2018 | Myers | B60Q 9/008 |

FOREIGN PATENT DOCUMENTS

| | | | |
|---|---|---|---|
| JP | 2007174323 | A | 7/2007 |
| JP | 2011-065338 | A | 3/2011 |
| JP | 2012034076 | A | 2/2012 |
| JP | 2012-113605 | A | 6/2012 |
| JP | 2016088158 | A | 5/2016 |

* cited by examiner

WARNING OUTPUT DEVICE

INCORPORATION BY REFERENCE

The disclosure of Japanese Patent Application No. 2016-252222 filed on Dec. 27, 2016 including the specification, drawings and abstract is incorporated herein by reference in its entirety.

BACKGROUND

1. Technical Field

The present disclosure relates to a warning output device.

2. Description of Related Art

A technique which, in a case where a moving object is detected by an image sensor, calculates a moving speed of the moving object, in a case where the moving object is entering a moving route of a host vehicle, superimposes warning display on an image on a side, on which the moving object is entering, among a rear image, a rear left image, and a rear right image, and outputs warning sound from a speaker on the side, on which the moving object is entering (for example, see Japanese Unexamined Patent Application Publication No. 2012-113605 (JP 2012-113605 A)).

SUMMARY

However, in the related art described above, it is difficult to reduce troublesomeness that may be given to an occupant due to a warning more than needed, while securing a warning function needed for informing the occupant of the presence of an obstacle behind the host vehicle. For example, in a vehicle stop state, when an obstacle is present comparatively far behind the host vehicle, in a case where warning sound is continuously output, troublesomeness is likely to be given to the occupant. Meanwhile, under a situation described above, in a case where warning sound or warning display is not output at all, there is a possibility that the occupant misunderstands that an obstacle is not present behind the host vehicle.

Accordingly, the disclosure provides a warning output device capable of further reducing troublesomeness that may be given to an occupant due to a warning more than needed, while securing a warning function needed for informing the occupant of the presence of an obstacle behind a host vehicle.

An aspect of the disclosure relates to a warning output device. The warning output device includes a sensor unit configured to detect a first obstacle behind a host vehicle, and an electronic control unit. The electronic control unit is configured to, when a shift position is an R range, output a warning for informing an occupant of the presence of the first obstacle based on information from the sensor unit indicating that the first obstacle is detected; in a first state in which the first obstacle is present within a first predetermined area behind the host vehicle, output first predetermined warning display and first predetermined warning sound; and, in a vehicle stop state and a second state in which the first obstacle is not present within the first predetermined area and the first obstacle is present within a second predetermined area behind the host vehicle farther from the host vehicle than the first predetermined area, output second predetermined warning display and second predetermined warning sound. The electronic control unit is configured to, in the second state, output the second predetermined warning sound for a predetermined time, then stop the output of the second predetermined warning sound, and output the second predetermined warning display for a longer time than the second predetermined warning sound.

According to the aspect of the disclosure, in the first state, since the first predetermined warning display and the first predetermined warning sound are output, under a situation in which the first obstacle is present at a comparatively close position behind the host vehicle, it is possible to secure a needed warning function. In the second state, the second predetermined warning display and the second predetermined warning sound are output, and the second predetermined warning display is output for a longer time than the second predetermined warning sound. With this, even under a situation in which the first obstacle is present at a comparatively far position behind the host vehicle, it is possible to secure a needed warning function with a visual warning. In the second state, since the second predetermined warning sound is output for the predetermined time and then stopped, it is possible to further reduce troublesomeness that may be given to an occupant due to continuation of an acoustic warning more than needed.

In the warning output device according to the aspect of the disclosure, the electronic control unit may be further configured to predict whether or not the first obstacle enters the first predetermined area, and in a case where prediction is made that the first obstacle enters the first predetermined area, output the first predetermined warning display and the first predetermined warning sound.

According to the aspect of the disclosure, before the first state is brought, it is possible to output the first predetermined warning display and the first predetermined warning sound.

In the warning output device according to the aspect of the disclosure, the electronic control unit may be configured to, in the first state, output the first predetermined warning display and the first predetermined warning sound regardless of the vehicle stop state and a vehicle non-stop state.

According to the aspect of the disclosure, under a situation in which the first obstacle is present at a comparatively close position behind the host vehicle, it is possible to secure a needed warning function regardless of the vehicle stop state and the vehicle non-stop state.

In the warning output device according to the aspect of the disclosure, the electronic control unit may be further configured to, in a vehicle non-stop state and a third state in which the first obstacle is present within the second predetermined area, output the first predetermined warning display and the first predetermined warning sound.

According to the aspect of the disclosure, since a need for a warning is higher in the vehicle non-stop state than in the vehicle stop state, it is possible to secure a needed warning function in the third state.

In the warning output device according to the aspect of the disclosure, the first obstacle may be a person.

According to the aspect of the disclosure, an occupant of the host vehicle is made to be aware of the presence of a person (pedestrian) behind the host vehicle with a warning, whereby it is possible to achieve safety of a person behind the host vehicle.

In the warning output device according to the aspect of the disclosure, the warning output device may further include an ultrasonic sensor unit that is configured to detect a predetermined obstacle including a second obstacle other than a person behind the host vehicle using an ultrasonic wave. The sensor unit may include an image sensor. The electronic control unit may be configured to, in a state in which the shift position is the R range and the predetermined obstacle is detected by the ultrasonic sensor unit, output third predetermined warning sound, and in a case where either of the first predetermined warning sound or the second predetermined warning sound is an output state, inhibit outputting the third predetermined warning sound.

According to the aspect of the disclosure, it is possible to realize a warning with priority on safety of a pedestrian, while adding a new warning function based on information from the ultrasonic sensor unit.

In the warning output device according to the aspect of the disclosure, the warning output device may further include a radar sensor unit that is configured to detect a third obstacle that is a moving object other than a person behind the host vehicle and is equal to or greater than a predetermined physique. The sensor unit may be constituted of an image sensor. The electronic control unit may be further configured to, in a fourth state in which the shift position is the R range and a cross point position of an extension line of a moving direction of the host vehicle and an extension line of a moving direction of the third obstacle is within a predetermined distance with respect to a host vehicle position, output fourth predetermined warning sound, and in the second state and the fourth state, output the fourth predetermined warning sound after the stop of the second predetermined warning sound with lapse of the predetermined time.

According to the aspect of the disclosure, in a case where a new warning function based on information from the radar sensor unit is added, it is possible to output the fourth predetermined warning sound after the second predetermined warning sound is stopped, while realizing a warning with priority on safety of a pedestrian.

According to the aspect of the disclosure, it is possible to further reduce troublesomeness that may be given to an occupant due to a warning more than needed, while securing a warning function needed for informing the occupant of the presence of an obstacle behind the host vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, each example will be described in detail referring to the accompanying drawings.

Example 1

Figure 1:
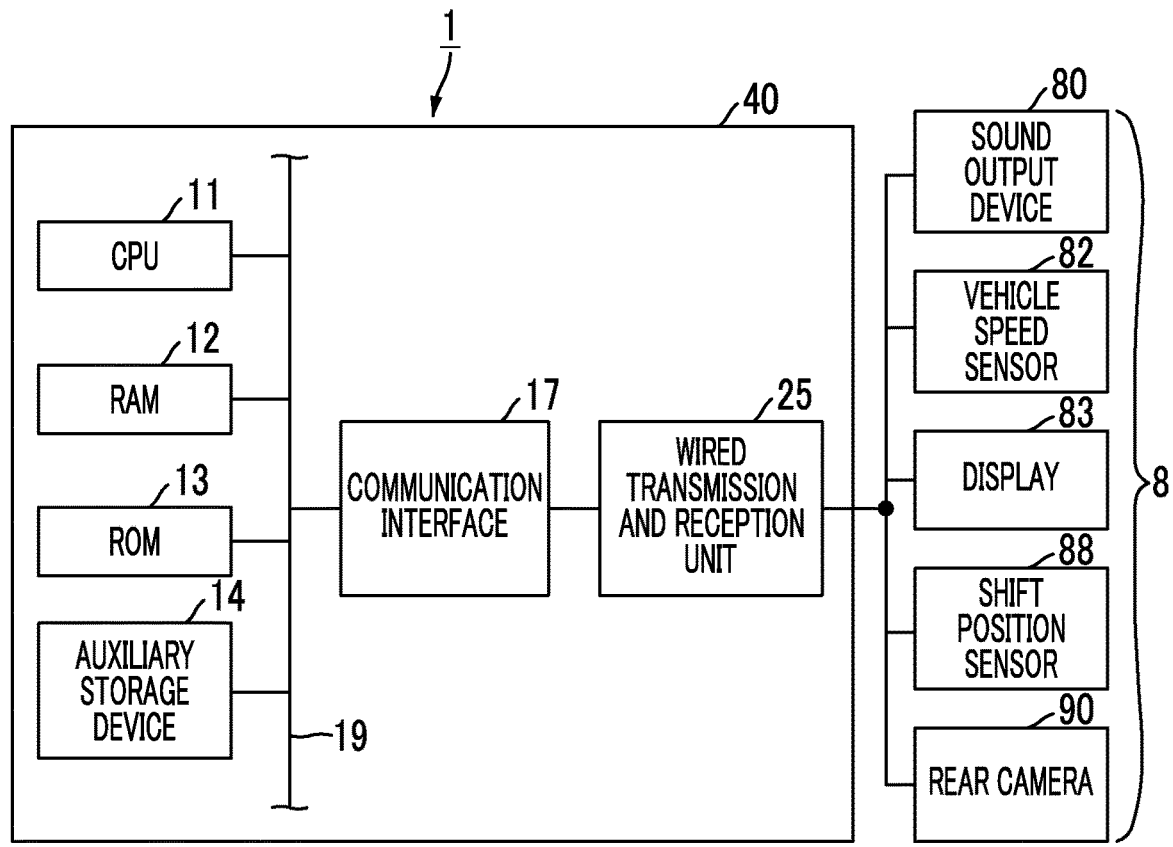
FIG. 1 is a diagram showing an example of the configuration of a warning output device according to Example 1.

FIG. 1 is a diagram showing an example of the configuration of a warning output device 1 according to Example 1.

The warning output device 1 is mounted in a vehicle. The warning output device 1 includes a control device 40 and an in-vehicle electronic apparatus group 8. Hereinafter, the vehicle in which the warning output device 1 is mounted is referred to as a "host vehicle".

The control device 40 is constituted of a computer. For example, the control device 40 is an electronic control unit (ECU). FIG. 1 is a diagram showing an example of the hardware configuration of the control device 40. In FIG. 1, the in-vehicle electronic apparatus group 8 is schematically shown in association with the hardware configuration of the control device 40.

The control device 40 includes a central processing unit (CPU) 11, a random access memory (RAM) 12, a read only memory (ROM) 13, an auxiliary storage device 14, and a communication interface 17 connected by a bus 19, and a wired transmission and reception unit 25 connected to the communication interface 17.

The wired transmission and reception unit 25 includes a transmission and reception unit that can perform communication using a vehicle network, such as a controller area network (CAN) or a local interconnect network (LIN). The in-vehicle electronic apparatus group 8 is connected to the control device 40 through the wired transmission and reception unit 25. The control device 40 may include a wireless transmission and reception unit (not shown) connected to the communication interface 17, in addition to the wired transmission and reception unit 25. In this case, the wireless transmission and reception unit may include a near field communication (NFC) unit, a Bluetooth (Registered Trademark) communication unit, a wireless-fidelity (Wi-Fi) transmission and reception unit, an infrared transmission and reception unit, or the like.

The in-vehicle electronic apparatus group 8 includes a sound output device 80, a vehicle speed sensor 82, a display 83, a shift position sensor 88, and a rear camera 90.

The sound output device 80 is a device that outputs warning sound. The sound output device 80 can be realized by a buzzer, a speaker, or the like. A plurality of sound output devices 80 may be provided.

The vehicle speed sensor 82 outputs vehicle speed information representing a vehicle speed.

The display 83 is, for example, a touch panel type liquid crystal display. The display 83 is disposed at a position where a user (occupant) of the host vehicle can view the display 83. The display 83 is a display that is fixed in the host vehicle, but may be a display of a portable terminal that is carried into the host vehicle. In this case, communication between the portable terminal and the control device 40 can be realized through the wireless transmission and reception unit (for example, a Bluetooth communication unit).

The shift position sensor 88 outputs information (hereinafter, referred to as "shift position information") representing a shift position (shift range).

The rear camera 90 includes, for example, an imaging element, such as a charge-coupled device (CCD) or a complementary metal oxide-semiconductor (CMOS). The rear camera 90 images scenery (scene) behind the host vehicle. Scenery behind the host vehicle is scenery rearward of a rear end portion of the host vehicle, and may include scenery outside the host vehicle in a vehicle width direction of the host vehicle.

Figure 2:
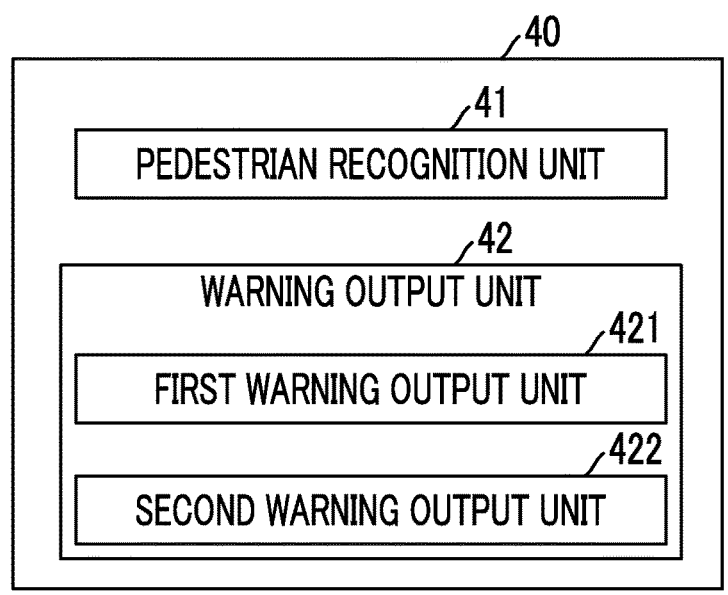
FIG. 2 is a functional block diagram showing an example of a function of a control device.

FIG. 2 is a functional block diagram showing an example of a function of the control device 40.

The control device 40 includes a pedestrian recognition unit 41 and an warning output unit 42. The pedestrian recognition unit 41 and the warning output unit 42 can be realized by the CPU 11 executing one or more programs in a storage device (for example, the ROM 13).

The pedestrian recognition unit 41 performs person image recognition processing for recognizing a pedestrian (hereinafter, simply referred to as a "person") behind the host vehicle based on image information from the rear camera 90. An image recognition method of a person in the person image recognition processing can use, for example, pattern matching, template matching, or the like. In a case where a person is recognized, the pedestrian recognition unit 41 generates information (hereinafter, referred to as "person positional information") representing a position (a position with respect to the host vehicle) of the recognized person. The pedestrian recognition unit 41 forms an example of a "sensor unit (image sensor)" in cooperation with the rear camera 90. The function of the pedestrian recognition unit 41 may be realized by a computer that may be embedded in the rear camera 90.

The warning output unit 42 outputs an obstacle warning having a function of informing an occupant of the presence of a person (pedestrian) behind the host vehicle based on a processing result (person positional information) from the pedestrian recognition unit 41 when the shift position is an R range. Determination can be made whether or not the shift position is the R range based on the shift position information from the shift position sensor 88.

The warning output unit 42 includes a first warning output unit 421 and a second warning output unit 422. In the warning output unit 42, an obstacle warning is output selectively using either of the first warning output unit 421 or the second warning output unit 422.

Figure 3A:
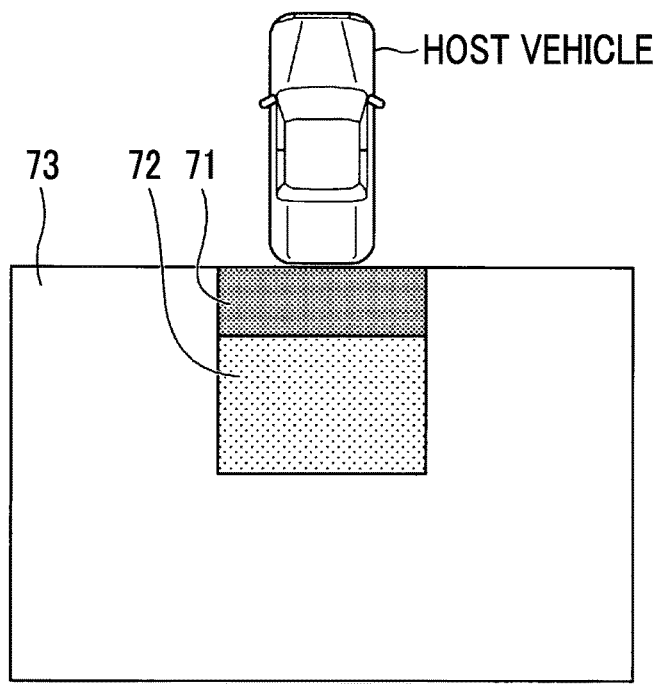
FIG. 3A is an explanatory view of a warning determination area.

The first warning output unit 421 brings a state of outputting first predetermined warning display and first predetermined warning sound (both are an example of an obstacle warning) in a state (hereinafter, referred to as a "first state") in which a person is present within a first warning determination area 71 behind the host vehicle. As shown in FIG. 3A, the first warning determination area 71 is closer to the host vehicle than the second warning determination area 72. In an example shown in FIG. 3A, the first warning determination area 71 has a rectangular shape that is long in the vehicle width direction, and has a size of, for example, 1 m×3 m. In the example shown in FIG. 3A, the first warning determination area 71 has a center in a width direction set on a longitudinal axis of the host vehicle. The first state can be detected based on the relationship between positional information (known) of the first warning determination area 71 and person positional information.

Figure 3B:
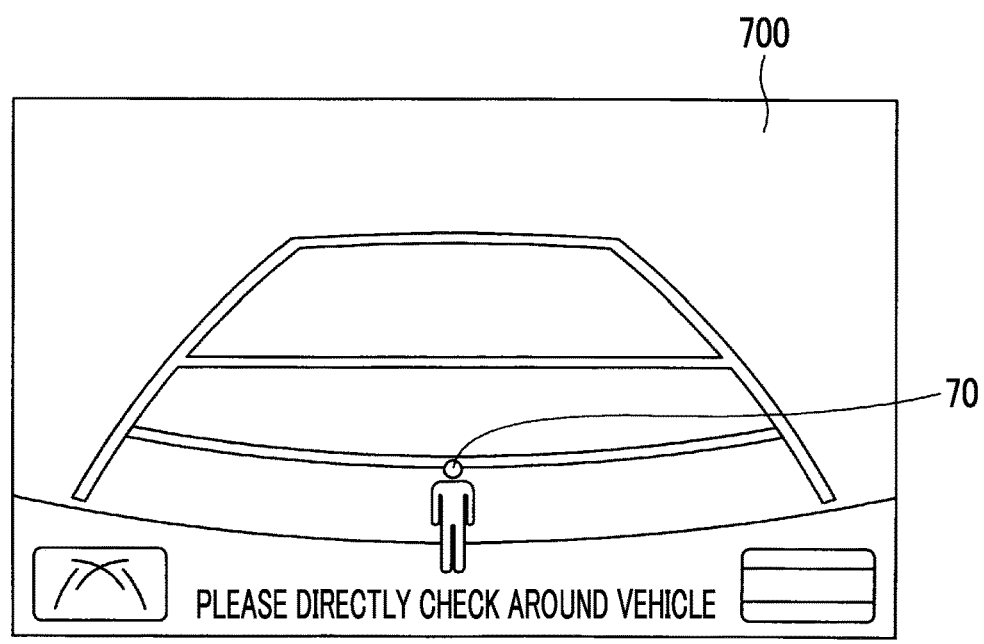
FIG. 3B is an explanatory view of first predetermined warning display.

The first predetermined warning display is superimposed on a host vehicle rear image. The host vehicle rear image is generated based on the image information from the rear camera 90 when the shift position is the R range and is output to the display 83, for example. The first predetermined warning display may be a form (see FIG. 3B) of a person mark schematically representing a person, a form of frame display surrounding a recognized person, or the like. FIG. 3B shows a person mark 70 superimposed on a host vehicle rear image 700. In the output state of the first predetermined warning display, the person mark 70 is in a blinking form, a form of being lit up, a form of blinking and then being lit up, or the like.

The first predetermined warning sound has a function of informing an occupant of the output of the first predetermined warning display with sound (that is, a function of guiding the line of sight of the occupant to the first predetermined warning display) and a function of notifying the occupant of a warning state with sound. The first predetermined warning sound is output through the sound output device 80. The first predetermined warning sound is, for example, warning sound, such as "beep beep beep . . . ". In the output state of the first predetermined warning sound, sound "beep beep beep" is output at every predetermined interval $\Delta p1$. The predetermined interval $\Delta p1$ may be constant or may be variable. For example, the predetermined interval $\Delta p1$ may be shortened with the lapse of time.

In addition, the first warning output unit 421 outputs the first predetermined warning display and the first predetermined warning sound in a vehicle non-stop state and a state (hereinafter, referred to as a "third state") in which a person is present within a second warning determination area 72. The third state can be detected by the same way of thinking as in a detection method of a second state described below, for example. A further preferred function of the first warning output unit 421 will be described below.

The second warning output unit 422 brings a state of outputting second predetermined warning display (an example of an obstacle warning) and brings a state of outputting second predetermined warning sound (an example of an obstacle warning) for a predetermined time $\Delta T$ in a vehicle stop state and a state (hereinafter, referred to as a "second state") in which a person is not present within the first warning determination area 71 and a person is present within the second warning determination area 72. That is, in the second state, while the output state of the second predetermined warning sound is released and transitions to a stop state after a predetermined time $\Delta T$ elapses, the output state of the second predetermined warning display is maintained even after the predetermined time $\Delta T$ elapses.

The second state can be detected as follows, for example. A state in which a person is not present within the first warning determination area 71 can be detected based on the relationship between the positional information (known) of the first warning determination area 71 and the person positional information. The presence of a person within the second warning determination area 72 can be detected based on the relationship between positional information (known) of the second warning determination area 72 and person positional information. The vehicle stop state can be detected based on the vehicle speed information from the vehicle speed sensor 82.

As shown in FIG. 3A, the second warning determination area 72 is farther from the host vehicle than the first warning determination area 71. In the example shown in FIG. 3A, the second warning determination area 72 has a rectangular shape that is long in the vehicle width direction, and has a size of, for example, 2 m×3 m. In the example shown in FIG. 3A, the second warning determination area 72 has a center in a width direction set on the longitudinal axis of the host vehicle. In the example shown in FIG. 3A, a peripheral area 73 is shown. The peripheral area 73 is an area within an angle of view of the rear camera 90 (a person or the like within the peripheral area 73 can be checked by the occupant through the host vehicle rear image).

The second predetermined warning display is superimposed on the host vehicle rear image. Similarly to the first predetermined warning display, the second predetermined warning display may be a form of a person mark schematically representing a person, a form of frame display surrounding a recognized person, or the like (see FIG. 3B). In the output state of the second predetermined warning display, the second predetermined warning display is a blinking form, a form of being lit up, a form of blinking and then being lit up, or the like.

The second predetermined warning sound has a function of informing the occupant of the output of the second predetermined warning display with sound (that is, a function of guiding the line of sight of the occupant to the second predetermined warning display). The second predetermined warning sound is output through the sound output device 80. Similarly to the first predetermined warning sound, the second predetermined warning sound is, for example, warning sound, such as "beep beep beep . . . ". In the output state of the second predetermined warning sound, sound "beep beep beep" is output at every predetermined interval Δp2. The predetermined interval Δp2 may be equal to or different from the predetermined interval Δp1 related to the first predetermined warning sound. In a case where the predetermined interval Δp2 is different from the predetermined interval Δp1, the predetermined interval Δp2 is set to be longer than the predetermined interval Δp1. This is because the second warning determination area 72 is farther from the host vehicle than the first warning determination area 71, and thus, a warning level of the second predetermined warning sound may be lower than that of the first predetermined warning sound. From the same viewpoint, the volume of sound "beep beep beep" of the second predetermined warning sound may be equal to the first predetermined warning sound or may be smaller than the first predetermined warning sound.

The predetermined time ΔT is an adaptive value that is set from a viewpoint of making the occupant be aware of the output of the second predetermined warning display while preventing continuation of the second predetermined warning sound more than needed. That is, the predetermined time ΔT is an adaptive value that is set from a viewpoint of achieving both of reduction of troublesomeness and informing of the presence of the second predetermined warning display. The predetermined time ΔT may be a needed minimum time for which the function of the second predetermined warning sound (the function of guiding the line of sight of the occupant to the second predetermined warning display) is fulfilled, and is set to, for example, about three seconds.

In a case where the second predetermined warning display and the second predetermined warning sound start to be output, thereafter, in the vehicle stop state and the state in which a person is not present within the first warning determination area 71, even though a person is not present within the second warning determination area 72, the second warning output unit 422 continuously outputs the second predetermined warning display and the second predetermined warning sound until the predetermined time ΔT elapses (that is, brings the state of outputting the second predetermined warning display and the second predetermined warning sound until the predetermined time ΔT elapses). A further preferred function of the second warning output unit 422 will be described below.

With the warning output device 1 of Example 1, as described above, in the state (first state) in which a person is present within the first warning determination area 71 closer to the host vehicle than the second warning determination area 72, the first predetermined warning display and the first predetermined warning sound are brought into the output state. Accordingly, as long as a person is present within the first warning determination area 71, basically (for example, excluding a case where the shift position is not the R range, or the like), the first predetermined warning display and the first predetermined warning sound are continuously output. With this, in a state in which a person is present within the first warning determination area 71, it is possible to secure a needed warning function. Since the state in which a person is present within the first warning determination area 71 is a state in which a person is at a position close to the host vehicle, the first predetermined warning sound that is continuously output is a warning that is basically needed, and has a higher possibility that troublesomeness is not given to the occupant.

With the warning output device 1 of Example 1, the first predetermined warning display and the first predetermined warning sound are brought into the output state regardless of whether or not the vehicle is in the vehicle stop state. With this, in the first state, even though the vehicle is in the vehicle stop state, it is possible to inform the occupant of the presence of a person at a position close to the host vehicle.

With the warning output device 1 of Example 1, in the vehicle stop state and the state (second state) in which a person is not present within the first warning determination area 71 and a person is present within the second warning determination area 72, the second predetermined warning display and the second predetermined warning sound are output. In the second state, solely the second predetermined warning sound of the second predetermined warning display and the second predetermined warning sound is stopped in a case where the predetermined time ΔT elapses. With this, in the second state in which a need for a warning is relatively lower than in the first state, a state of outputting the second predetermined warning sound for the predetermined time ΔT is brought, whereby it is possible to further reduce inconvenience (troublesomeness given to the occupant) due to the second predetermined warning sound being continuously output longer than the predetermined time ΔT, while informing the occupant of the output of the second predetermined warning display.

With the warning output device 1 of Example 1, in the second state, even though the predetermined time ΔT elapses (even though the second predetermined warning sound is stopped), the second predetermined warning display is brought into the output state (that is, the second predetermined warning display is continuously output). Since the second predetermined warning display is display that is output to the display 83, there is a possibility that the second predetermined warning display does not get into the eyes of the occupant according to a sight direction of the occupant (for example, when the display 83 is disposed in an instrument panel and a driver views forward the front, the second predetermined warning display hardly gets into the eyes of the driver). From this, the second predetermined warning display has a warning function lower than the second predetermined warning sound as sound, but gives less troublesomeness to the occupant. Accordingly, the second predetermined warning display is continuously output, whereby it is possible to further reduce troublesomeness compared to a case where the second predetermined warning sound is continuously output, while securing a warning function of continuously informing the occupant of the presence of a person within the second warning determination area 72.

With the warning output device 1 of Example 1, in the third state, the first predetermined warning display and the first predetermined warning sound are output. In a case where the positional relationship between the person and the host vehicle is identical, a need for a warning is higher in the non-stop state than in the stop state. With this, it is possible to secure a needed warning function.

Next, an operation example of the warning output device 1 will be described referring to FIGS. 4 to 6.

Figure 4:
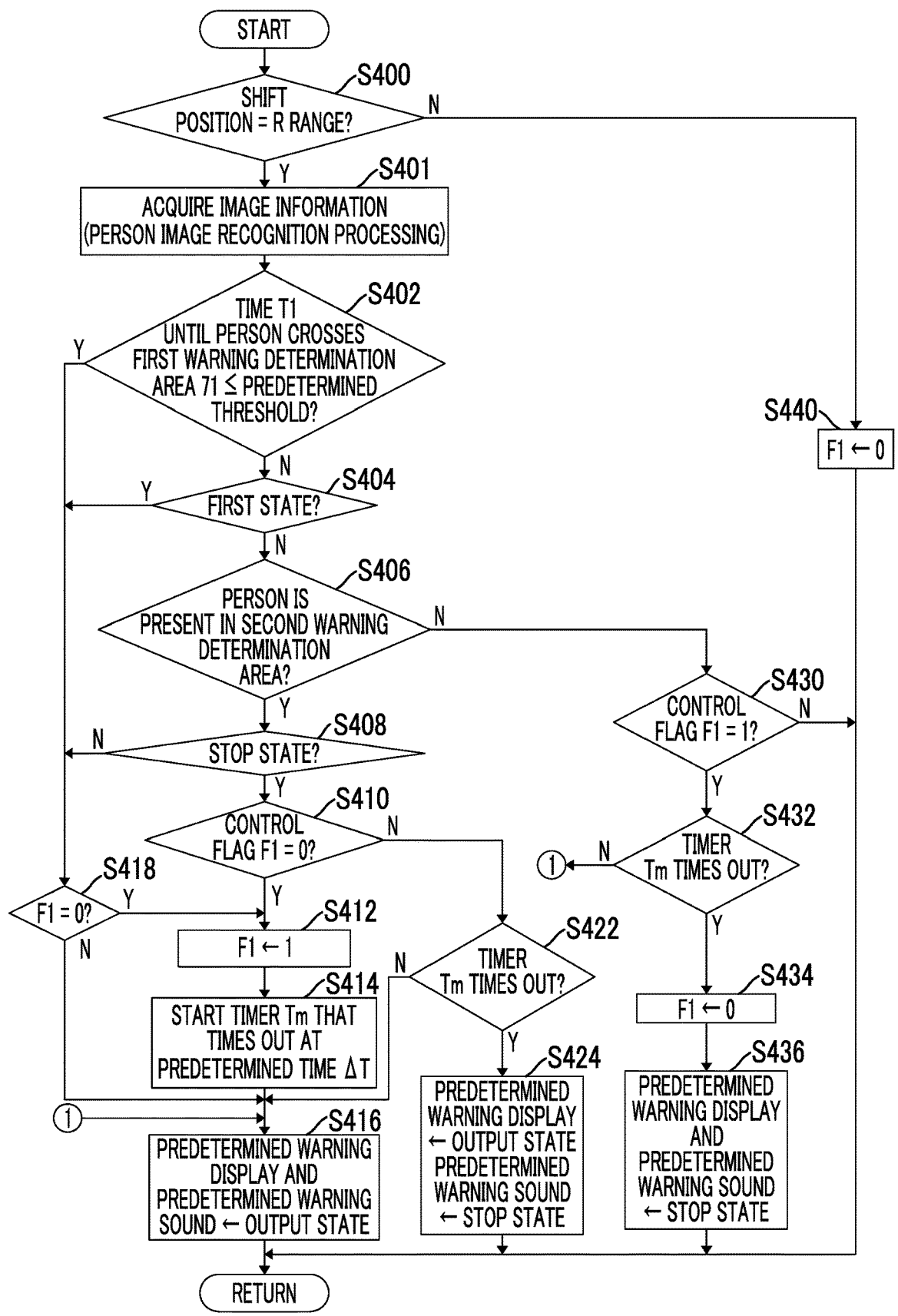
FIG. 4 is a schematic flowchart showing an example of image sensor warning processing that is performed by the control device.
Figure 5:
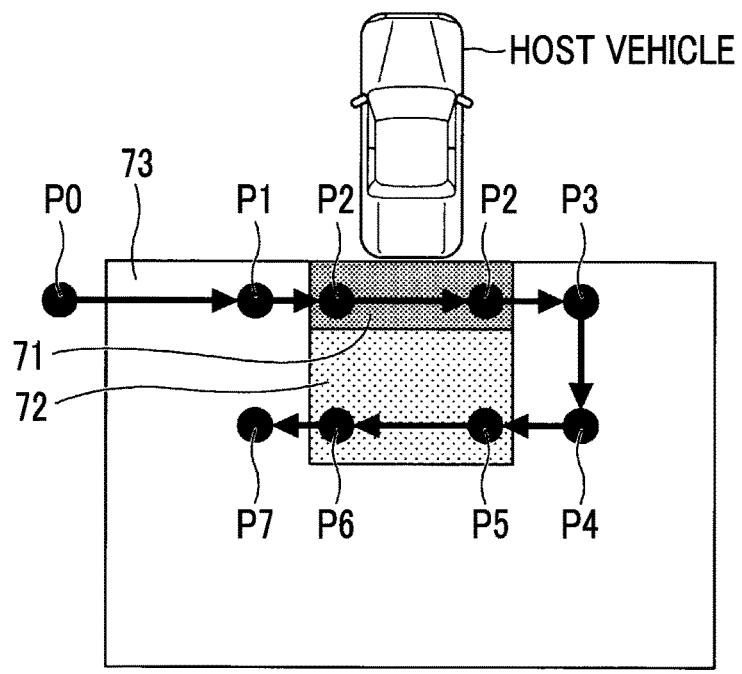
FIG. 5 is a diagram showing a movement example in which a person moves behind a host vehicle.
Figure 6:
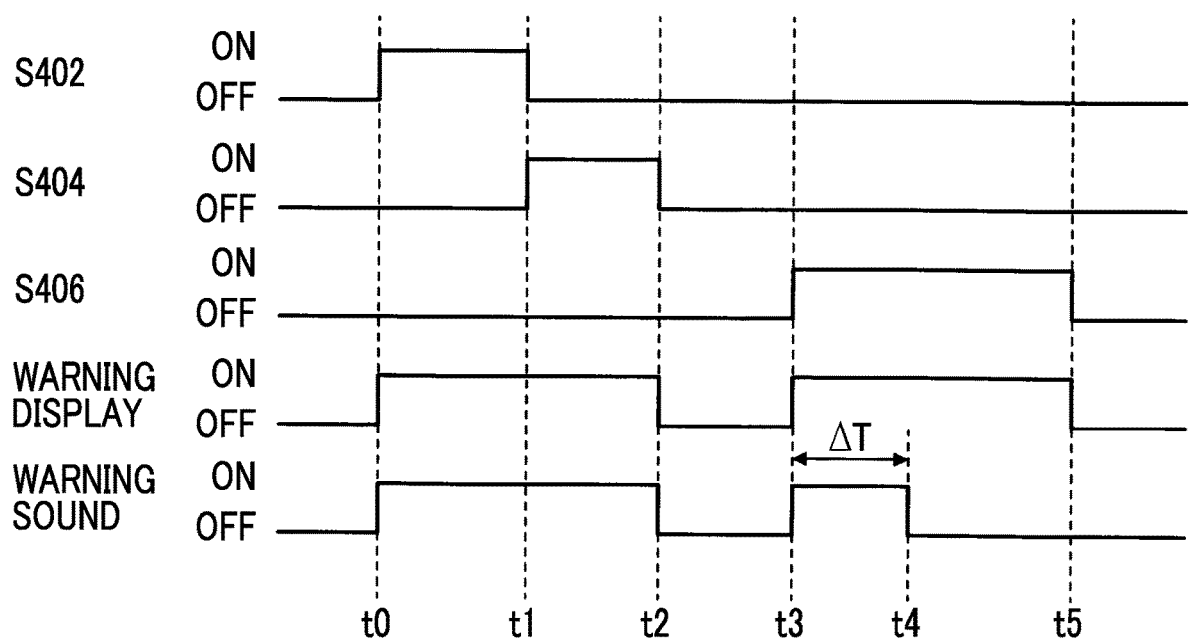
FIG. 6 is a timing chart of each state in a case of the movement example shown in FIG. 5.

In FIGS. 4 to 6, as an example, it is assumed that the second predetermined warning sound is the same as the first predetermined warning sound except for an output duration, and the second predetermined warning display is the same as the first predetermined warning display. Accordingly, in FIGS. 4 to 6, the first predetermined warning sound and the second predetermined warning sound may be referred to as "predetermined warning sound" without distinction. It is assumed that, in an "output state of predetermined warning sound", sound "beep beep beep" is output at every predetermined interval Δp1. In FIGS. 4 to 6, the first predetermined warning display and the second predetermined warning display may be referred to as "predetermined warning display" without distinction.

FIG. 4 is a schematic flowchart showing an example of image sensor warning processing that is performed by the control device 40. For example, the image sensor warning processing is performed in every predetermined cycle while an ignition switch is turned on. Every predetermined cycle may correspond to a frame cycle of an image obtained by the rear camera 90.

In Step S400, the warning output unit 42 determines whether or not the shift position is the R range. In a case where the determination result is "YES", the process progresses to Step S401, and otherwise, the process progresses to Step S440.

In Step S401, the pedestrian recognition unit 41 acquires the image information from the rear camera 90 and performs the person image recognition processing based on the acquired image information.

In Step S402, the warning output unit 42 predicts whether or not a person enters the first warning determination area 71 behind the host vehicle based on a result of the person image recognition processing obtained in Step S401. Specifically, the warning output unit 42 calculates a time T1 until a person crosses the first warning determination area 71 behind the host vehicle based on the result of the person image recognition processing obtained in Step S401, and determines whether or not the time T1 is equal to or less than a predetermined threshold. In a case where a person is not recognized in Step S401, the determination result in Step S402 becomes "NO". Even in a case where a person is already present within the first warning determination area 71, the determination result in Step S402 becomes "NO". The time T1 can be calculated based on the person positional information. For example, a moving speed V1 and a moving direction of the person with respect to the host vehicle are calculated based on the person positional information at a plurality of points of time, and a time needed until the person is positioned within the first warning determination area 71 can be calculated as the time T1 based on a current position of the person based on the person positional information, the moving speed V1 and the moving direction, and the positional information (known) of the first warning determination area 71. The predetermined threshold depends on the size of the first warning determination area 71, or the like, but is an adaptive value adapted based on a time until the occupant is aware of the predetermined warning display and the predetermined warning sound and stops the host vehicle. In a case where the determination result is "YES", the process progresses to Step S418, and otherwise, the process progresses to Step S404.

In Step S404, the warning output unit 42 determines whether or not the first state is detected based on the result of the person image recognition processing obtained in Step S401. A detection method of the first state is as described above. In a case where the determination result is "YES", the process progresses to Step S418, and otherwise, the process progresses to Step S406.

In Step S406, the warning output unit 42 determines whether or not a person is present within the second warning determination area 72 based on the result of the person image recognition processing obtained in Step S401. A determination method of whether or not a person is present within the second warning determination area 72 is as described above. In a case where the determination result is "YES", the process progresses to Step S408, and otherwise, the process progresses to Step S430.

In Step S408, the warning output unit 42 determines whether or not the vehicle is in the vehicle stop state based on the vehicle speed information from the vehicle speed sensor 82. A detection method of the vehicle stop state is as described above. In a case where the determination result is "YES", the process progresses to Step S410, and otherwise, the process progresses to Step S418.

In Step S410, the warning output unit 42 determines whether or not a control flag F1 is "0". As described below, a state of the control flag F1 is used for control of the output of the predetermined warning display and the predetermined warning sound. An initial value of the control flag F1 is "0".

In Step S412, the warning output unit 42 sets the control flag F1 to "1".

In Step S414, the warning output unit 42 starts a timer Tm that times out at the predetermined time ΔT.

In Step S416, the warning output unit 42 brings a state of outputting the predetermined warning display and the predetermined warning sound. The predetermined warning display and the predetermined warning sound are as described above.

In Step S418, the warning output unit 42 determines whether or not the control flag F1 is "0". In a case where the determination result is "YES", the process progresses to Step S412, and otherwise, the process progresses to Step S416.

In Step S422, the warning output unit 42 determines whether or not the timer Tm times out. In a case where the determination result is "YES", the process progresses to Step S424, and otherwise, the process progresses to Step S416.

In Step S424, the warning output unit 42 stops the predetermined warning sound and brings a state of outputting the predetermined warning display. That is, the warning output unit 42 continuously outputs solely the predetermined warning display of the predetermined warning display and the predetermined warning sound being output.

In Step S430, the warning output unit 42 determines whether or not the control flag F1 is "1". In a case where the determination result is "YES", the process progresses to Step S432, and otherwise, the processing in the present cycle ends as it is.

In Step S432, the warning output unit 42 determines whether or not the timer Tm times out. In a case where the determination result is "YES", the process progresses to Step S434, and otherwise, the process progresses to Step S416.

In Step S434, the warning output unit 42 resets the control flag F1 to "0".

In Step S436, the warning output unit 42 stops the predetermined warning display and the predetermined warning sound in the output state. That is, the warning output unit 42 makes the predetermined warning display and the predetermined warning sound transition to a stop state.

In Step S440, the warning output unit 42 resets the control flag F1 to "0" or maintains the control flag F1 to "0". When the predetermined warning display or the predetermined warning sound is in the output state, the warning output unit 42 makes the predetermined warning display or the predetermined warning sound transition to the stop state.

FIGS. 5 and 6 are explanatory views of FIG. 4. FIG. 5 is a diagram showing a movement example in which a person moves behind the host vehicle. In FIG. 5, a history of a position of a person is indicated by an arrow connecting • and •. FIG. 6 is a timing chart of each state in the processing shown in FIG. 4 that is realized in the movement example shown in FIG. 5, and shows, in order from above, the determination result of Step S402, the determination result of Step S404, the determination result of Step S406, a state of warning display, and a state of warning sound. In each determination result, "ON" corresponds to "YES (True)", and "OFF" corresponds to "NO (False)". In FIG. 6, "warning display" represents the predetermined warning display, and "warning sound" represents the predetermined warning sound.

In the example shown in FIGS. 5 and 6, it is assumed that the host vehicle is in a stop state. A person enters the peripheral area 73 from a position P0 and moves toward the first warning determination area 71. At this time, at time t0 (position P1), the determination result of Step S402 becomes "YES", and the predetermined warning display and the predetermined warning sound (first predetermined warning display and first predetermined warning sound) start to be output. Thereafter, the person enters the first warning determination area 71 at time t1 (position P2 on the left). Accordingly, the determination result of Step S404 becomes "YES" (the determination result of Step S402 becomes "NO"), and the predetermined warning display and the predetermined warning sound are continuously output. Thereafter, the person moves out from the first warning determination area 71 (see a position P3) and moves behind the host vehicle (see a position P4). Accordingly, at time t2, the determination result of Step S404 becomes "NO", and the predetermined warning display and the predetermined warning sound are stopped.

Thereafter, the person enters the second warning determination area 72 at time t3 (position P5). Accordingly, the determination result of Step S406 becomes "YES", and the predetermined warning display and the predetermined warning sound (second predetermined warning display and second predetermined warning sound) start to be output. Thereafter, while the person is present within the second warning determination area 72, the predetermined time $\Delta T$ elapses, and at time t4 after the predetermined time $\Delta T$, the predetermined warning sound is stopped. Thereafter, the person moves out from the second warning determination area 72 (see a position P7). Accordingly, at time t5, the determination result of Step S406 becomes "NO", and the predetermined warning display is stopped.

In this way, with the processing shown in FIG. 4, in a state in which the time T1 until a person crosses the first warning determination area 71 is equal to or less than the predetermined threshold or in the first state, the predetermined warning display and the predetermined warning sound (first predetermined warning display and first predetermined warning sound) are brought into the output state (see time t0 to t2 of FIG. 6). With this, in a state in which a person is at a position (that is, a position within the first warning determination area 71) close to the host vehicle or in a state in which a person approaches the position, it is possible to secure a needed warning function.

With the processing shown in FIG. 4, in the second state, the predetermined warning sound (second predetermined warning sound) is brought into the output state for the predetermined time $\Delta T$ (see Step S422) (see time t3 to t4 of FIG. 6). With this, it is possible to further reduce inconvenience (troublesomeness given to the occupant) due to the predetermined warning sound being continuously output longer than the predetermined time $\Delta T$, while informing the occupant of the output of the predetermined warning display (second predetermined warning display).

With the processing shown in FIG. 4, in the second state, even though the predetermined time $\Delta T$ elapses (even though the predetermined warning sound is stopped), the predetermined warning display (second predetermined warning display) is continuously output (see Step S424) (see time t4 to t5 of FIG. 6). With this, in the second state, even after the predetermined warning sound is stopped, it is possible to maintain a warning function by the predetermined warning display.

With the processing shown in FIG. 4, even not in a state in which the time T1 until a person crosses the first warning determination area 71 is equal to or less than the predetermined threshold or the first state, in the vehicle non-stop state and the state in which a person is present within the second warning determination area 72, the predetermined warning display and the predetermined warning sound are brought into the output state. With this, it is possible to operate a warning function in the vehicle non-stop state rather than in the vehicle stop state.

In the processing shown in FIG. 4, even though the determination result of Step S406 is "NO", while the timer Tm does not time out (that is, before the predetermined time $\Delta T$ elapses), the determination result of Step S432 becomes "NO", the process progresses to Step S416, and the predetermined warning display and the predetermined warning sound are brought into the output state. Accordingly, even in a case where a person instantaneously enters the second warning determination area 72 and then moves out to the peripheral area 73, the predetermined warning display and the predetermined warning sound are brought into the output state for the predetermined time ΔT. In the above-described case, it is possible to maintain an alert to a person near the host vehicle, while minimizing the output of the predetermined warning display and the predetermined warning sound.

In the processing shown in FIG. 4, in a case where the determination result of Step S402 is "YES", in Step S416, the predetermined warning display and the predetermined warning sound are brought into the output state; however, the disclosure is not limited thereto. For example, in a case where the determination result of Step S402 is "YES", determination may be made whether or not the vehicle is in the vehicle stop state, and solely in a case where the vehicle is not in the vehicle stop state, the predetermined warning display and the predetermined warning sound may be brought into the output state.

In the processing shown in FIG. 4, while the determination result of Step S404 is "YES", even though a long time elapses, the predetermined warning display and the predetermined warning sound are brought into the output state; however, the disclosure is not limited thereto. Even in a case where the determination result of Step S404 is "YES", in a case where the output state of the predetermined warning display and the predetermined warning sound is continued for a predetermined time ΔTth or more, the predetermined warning display and the predetermined warning sound may transition to the stop state. In this case, the predetermined time ΔTth is significantly longer than the predetermined time ΔT.

Example 2

Figure 7:
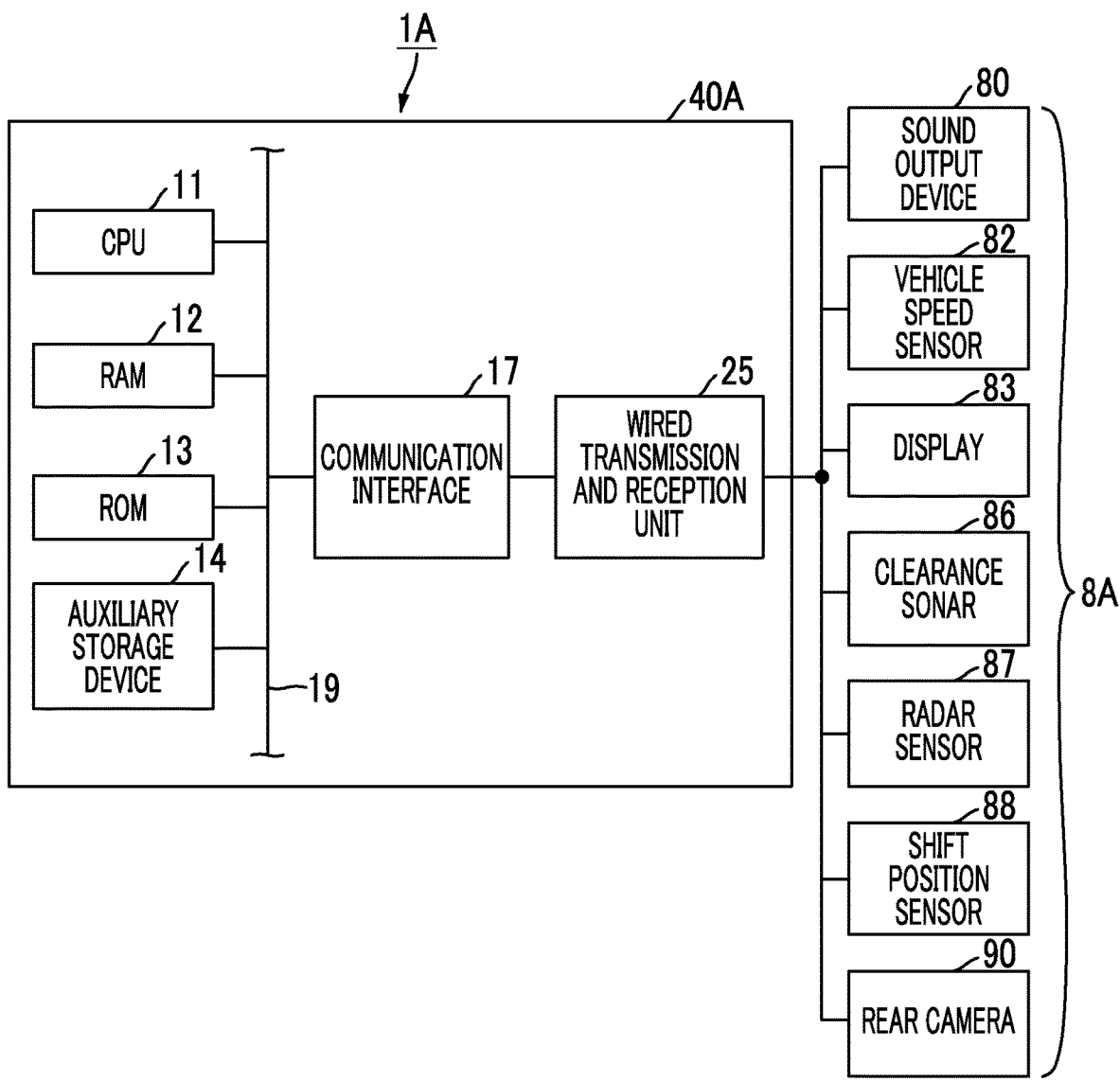
FIG. 7 is a diagram showing an example of the configuration of a warning output device according to Example 2.

FIG. 7 is a diagram showing an example of the configuration of a warning output device 1A according to Example 2. In the description of Example 2, similarly to the above description referring to FIGS. 4 to 6, the first predetermined warning sound and the second predetermined warning sound are referred to as "predetermined warning sound" without distinction, and the first predetermined warning display and the second predetermined warning display are referred to as "predetermined warning display" without distinction.

The warning output device 1A includes a control device 40A and an in-vehicle electronic apparatus group 8A.

The control device 40A is constituted of a computer. For example, the control device 40A is an electronic control unit (ECU). FIG. 7 is a diagram showing an example of the hardware configuration of the control device 40A. In FIG. 7, the in-vehicle electronic apparatus group 8A is schematically shown in association with the hardware configuration of the control device 40A. The hardware configuration of the control device 40A is the same as that of the control device 40 according to Example 1 described above, and thus, description thereof will not be repeated.

The in-vehicle electronic apparatus group 8A is different from the in-vehicle electronic apparatus group 8 according to Example 1 described above in that clearance sonars 86 and a radar sensor 87 are further included.

The clearance sonars 86 are provided right and left on the rear side of the host vehicle. The clearance sonars 86 transmit an ultrasonic wave behind the host vehicle and detect an obstacle behind the host vehicle based on a reflected wave of the ultrasonic wave. The clearance sonars 86 output sonar information according to a detection result of an obstacle. The sonar information includes information representing a position (a position with respect to the host vehicle) of an obstacle.

The radar sensor 87 is provided on the rear side of the host vehicle. The radar sensor 87 transmits a detection wave (for example, an electromagnetic wave, such as a millimeter wave, or laser) other than an ultrasonic wave behind the host vehicle, and detects an obstacle behind the host vehicle based on a reflected wave. In a case where laser is used, the radar sensor 87 is, for example, laser imaging detection and ranging (LIDAR). The radar sensor 87 outputs radar information according to a detection result of an obstacle. The radar information includes information representing a position (a position with respect to the host vehicle) and a speed (a relative speed with respect to the host vehicle) of an obstacle.

Figure 8:
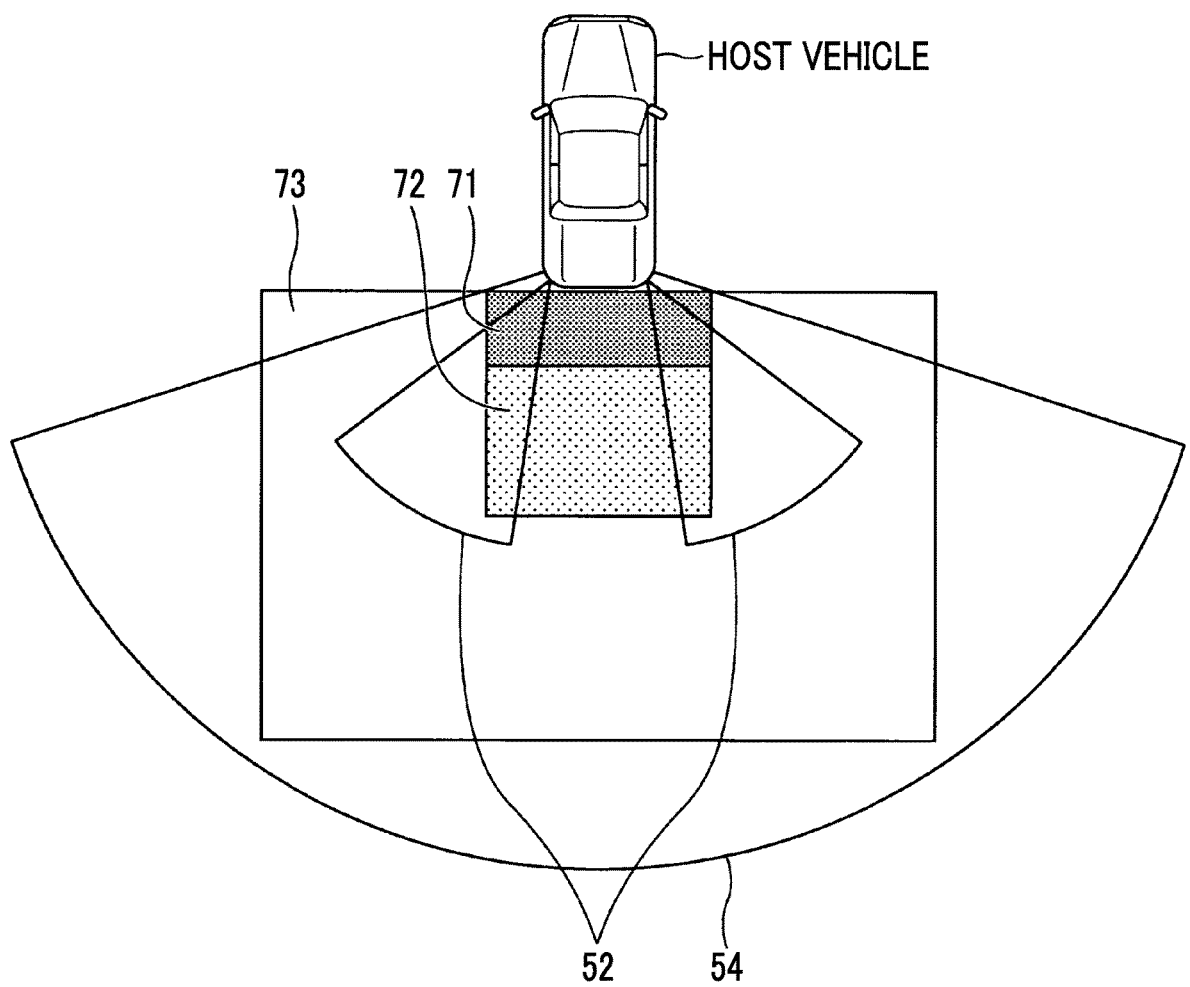
FIG. 8 is an explanatory view of an example of a detection area of a clearance sonar and a detection area of a radar sensor.

FIG. 8 is an explanatory view of an example of detection areas of the clearance sonars 86 and a detection area of the radar sensor 87. The detection areas 52 of the clearance sonars 86 overlap at least a part of at least one of the first warning determination area 71 and the second warning determination area 72. In the example of FIG. 8, the detection areas 52 overlap a part of the first warning determination area 71 and overlap a part of the second warning determination area 72. The detection area 54 of the radar sensor 87 overlaps at least a part of at least one of the first warning determination area 71 and the second warning determination area 72. In the example of FIG. 8, the detection area 54 includes the first warning determination area 71 and the second warning determination area 72. The detection areas 52, 54 shown in FIG. 8 are just an example. Accordingly, in regard to the detection areas 52, four clearance sonars 86 may be provided on the rear side of the host vehicle, and the detection areas 52 may be enlarged to include the second warning determination area 72.

Figure 9:
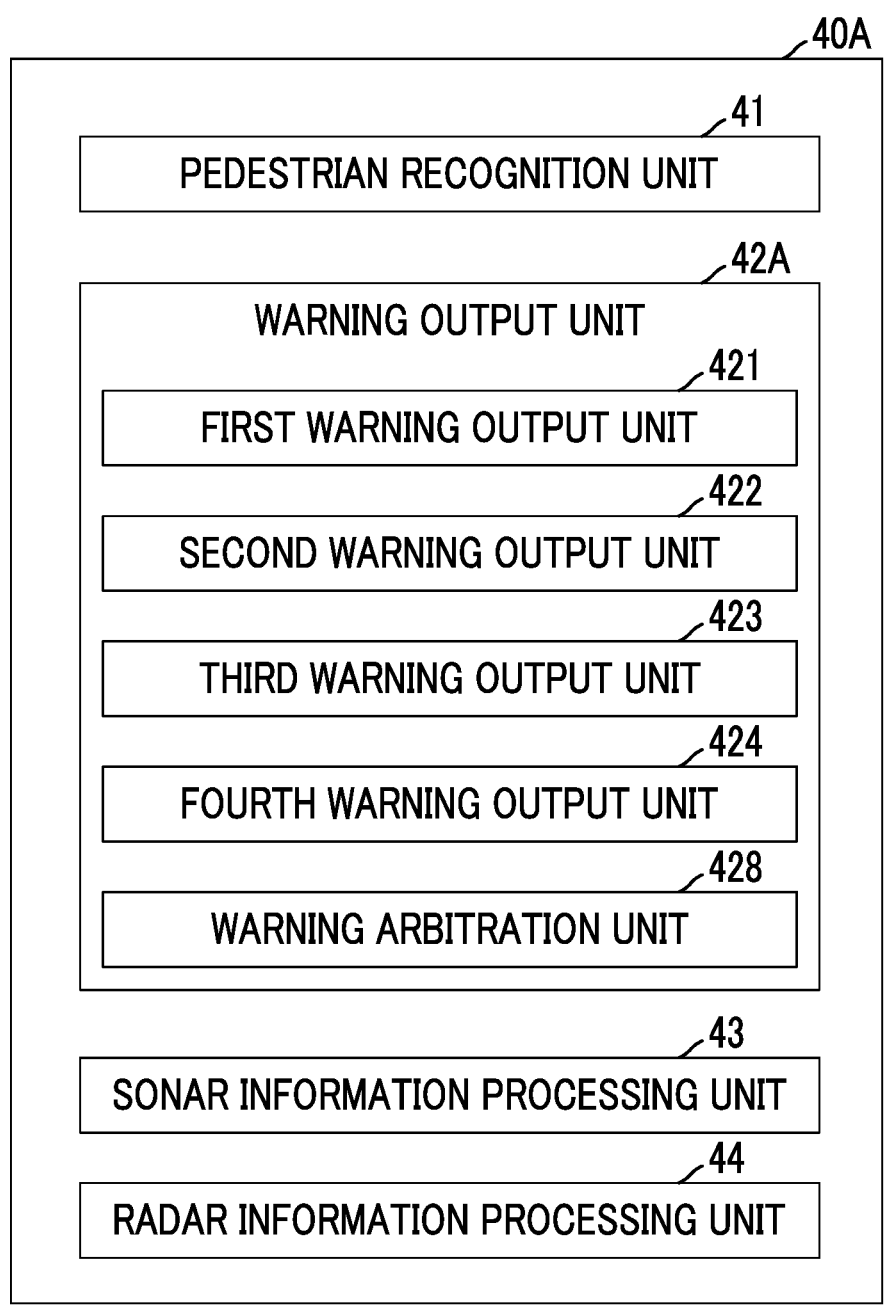
FIG. 9 is a functional block diagram showing an example of a function of the control device.

FIG. 9 is a functional block diagram showing an example of a function of the control device 40A. The control device 40A is different from the control device 40 according to Example 1 described above in that a sonar information processing unit 43 and a radar information processing unit 44 are further included, and the warning output unit 42 is substituted with an warning output unit 42A. The warning output unit 42A is different from the warning output unit 42 according to Example 1 described above in that a third warning output unit 423, a fourth warning output unit 424, and a warning arbitration unit 428 are further included.

The pedestrian recognition unit 41, the warning output unit 42A, the sonar information processing unit 43, and the radar information processing unit 44 can be realized by the CPU 11 executing one or more programs in the storage device (for example, the ROM 13).

Figure 10:
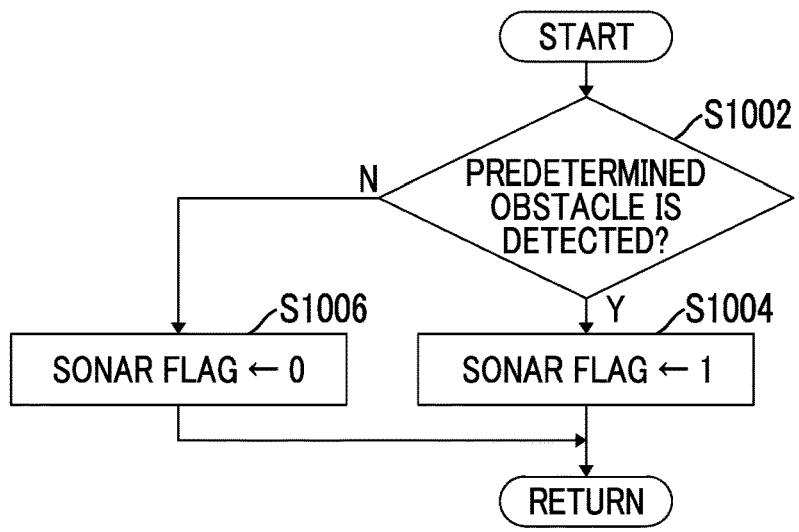
FIG. 10 is a schematic flowchart showing an example of processing that is performed by a sonar information processing unit.

The sonar information processing unit 43 forms an example of an "ultrasonic sensor unit" in cooperation with the clearance sonars 86. FIG. 10 is a schematic flowchart showing an example of sonar information processing that is performed by the sonar information processing unit 43.

In a case where a predetermined obstacle is detected based on the sonar information ("YES" in Step S1002), the sonar information processing unit 43 sets a sonar flag to "1" (Step S1004). In a case where a predetermined obstacle is not detected ("NO" in Step S1002), the sonar information processing unit 43 sets the sonar flag to "0" (Step S1006). The predetermined obstacle is an obstacle that has a predetermined size or more and is detected in a predetermined number or more of continuous cycles, and includes an obstacle (an example of a second obstacle) other than a person, for example, a wall, another vehicle or the like. The predetermined size is a threshold for eliminating the influence of noise, and determination can be made whether or not the size of the obstacle is equal to or greater than the predetermined size based on the size of point sequence data related to a reflection point of an object. There may be a case where a person is detected as the predetermined obstacle depending on the predetermined size.

Figure 11:
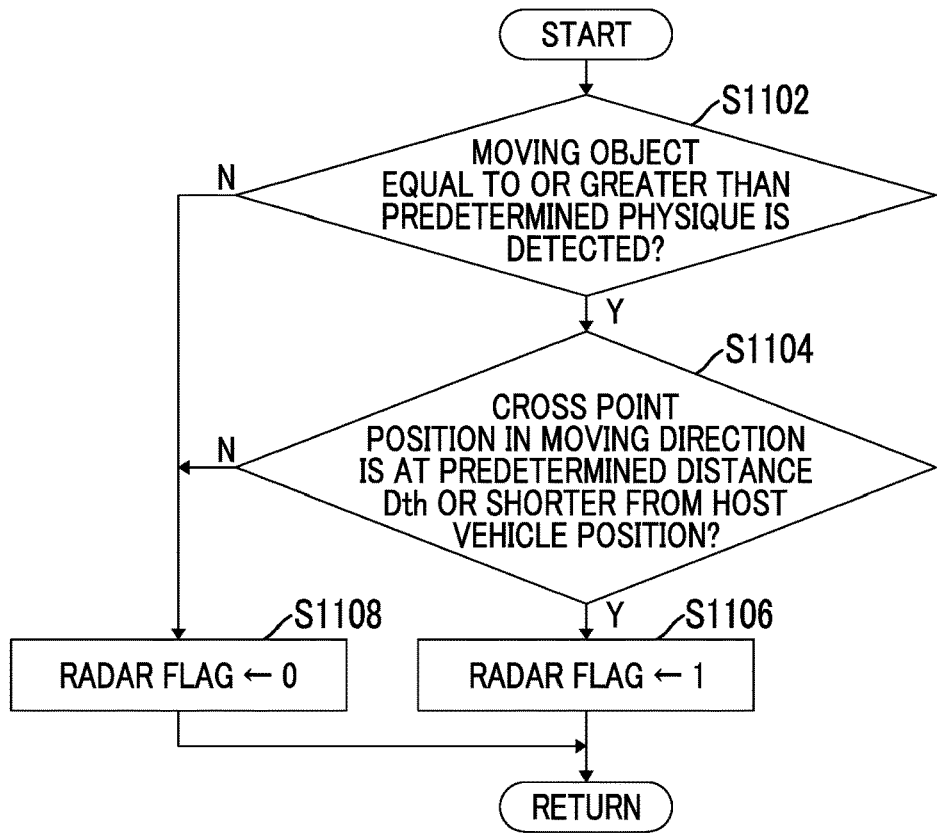
FIG. 11 is a schematic flowchart showing an example of processing that is performed by a radar information processing unit.

The radar information processing unit 44 forms an example of a "radar sensor unit" in cooperation with the radar sensor 87. FIG. 11 is a schematic flowchart showing an example of radar information processing that is performed by the radar information processing unit 44.

In a case where an obstacle (hereinafter, referred to as a "moving obstacle") (an example of a third obstacle) that is a moving object having a predetermined physique or more is detected based on the radar information ("YES" in Step S1102) and a cross point position of an extension line in a moving direction of the host vehicle and an extension line in a moving direction of the moving obstacle is at a predetermined distance Dth or shorter from the host vehicle position ("YES" in Step S1104), the radar information processing unit 44 sets the radar flag to "1" (Step S1106). In a case where a moving obstacle is not detected ("NO" in Step S1102) or in a case where the cross point position of the extension line in the moving direction of the host vehicle and the extension line in the moving direction of the moving obstacle is at a position longer than the predetermined distance Dth from the host vehicle position ("NO" in Step S1104), the radar information processing unit 44 sets the radar flag to "0" (Step S1108).

The predetermined physique is a threshold for detecting a moving object (for example, another vehicle) that is significantly greater than an object other than a person. Determination can be made whether or not the moving object is the predetermined physique or more based on the size of a set of reflection points of the detection wave. The predetermined distance Dth is a threshold that is adapted to realize safe stopping without contact with the moving obstacle, or the like. The predetermined distance Dth may be variable in a form of being shorter when the speed of the host vehicle is higher.

When the shift position is the R range, the warning output unit 42A outputs an obstacle warning having a function of informing the occupant of the presence of a person (pedestrian) behind the host vehicle or the presence of an object (for example, a wall or another vehicle) other than a person based on a processing result (person positional information) from the pedestrian recognition unit 41, a processing result from the sonar information processing unit 43, and a processing result from the radar information processing unit 44.

The warning output unit 42A includes a first warning output unit 421, a second warning output unit 422, a third warning output unit 423, a fourth warning output unit 424, and a warning arbitration unit 428. In Example 2, as an example, a sound output device 80 that is included in the in-vehicle electronic apparatus group 8A is, for example, a buzzer, and is used in common among the first warning output unit 421, the second warning output unit 422, the third warning output unit 423, and the fourth warning output unit 424.

In a state (hereinafter, referred to as a "sonar warning condition establishment state) in which an arbitration flag described below by the warning arbitration unit 428 is "0" and the sonar flag is "1", the third warning output unit 423 brings a state of outputting third predetermined warning display and third predetermined warning sound (both are an example of an obstacle warning) for a predetermined time ΔT3. The predetermined time ΔT3 is significantly longer than the above-described predetermined time ΔT, and in Example 2, as an example, corresponds to a time of the sonar warning condition establishment state. In a state in which the arbitration flag described below by the warning arbitration unit 428 is "1", the third warning output unit 423 brings the third predetermined warning display and the third predetermined warning sound into the stop state regardless of the state of the sonar flag.

Figure 12A:
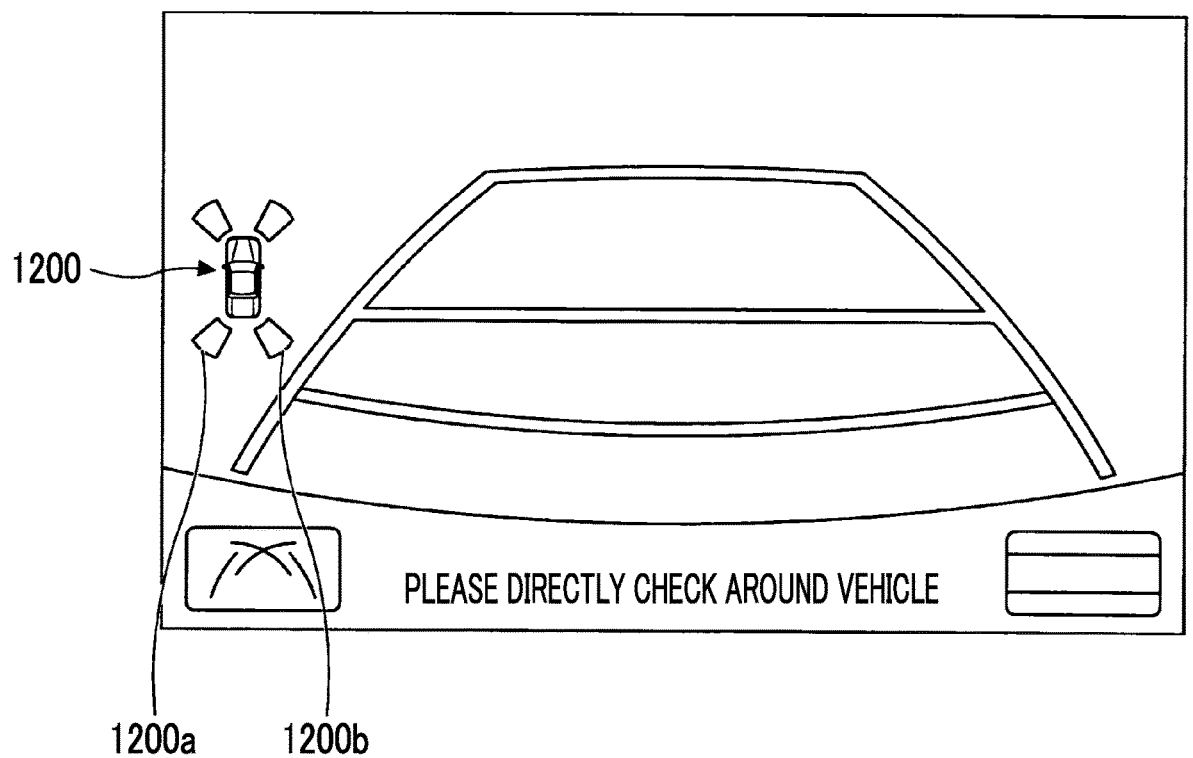
FIG. 12A is an explanatory view of third predetermined warning display.
Figure 12B:
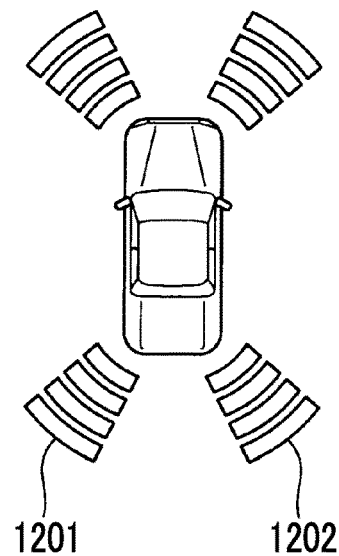
FIG. 12B is an explanatory view of the third predetermined warning display.

For example, the third predetermined warning display is predetermined display that is superimposed on the host vehicle rear image of the display 83 as shown in FIG. 12A or predetermined display that is output within a meter as shown in FIG. 12B. In an example shown in FIG. 12A, the third predetermined warning display includes display 1200 modeled after detection waves and the host vehicle in a bird's-eye view, and is output with a display portion 1200*a* and/or 1200*b* modeled after the detection wave in the display 1200 enhanced. In an example shown in FIG. 12B, the third predetermined warning display includes displays 1201, 1202 modeled after the detection waves, and is output with the display 1201 and/or 1202 enhanced. The third predetermined warning sound is output through the sound output device 80.

Similarly to the above-described predetermined warning sound, the third predetermined warning sound is, for example, warning sound, such as "beep beep beep". In the output state of the third predetermined warning sound, sound "beep beep beep" is output at every predetermined interval Δp3. The predetermined interval Δp3 may be constant or may be variable. For example, the predetermined interval Δp3 may be shortened with the lapse of time. The third warning output unit 423 may be configured not to output the third predetermined warning display. In Example 2, as an example, it is assumed that the third warning output unit 423 is configured not to output the third predetermined warning display.

In a state (hereinafter, referred to as a "radar warning condition establishment state") in which the arbitration flag described below by the warning arbitration unit 428 is "0" and the radar flag is "1", the fourth warning output unit 424 brings a state of outputting fourth predetermined warning display and fourth predetermined warning sound (both are an example of an obstacle warning) for a predetermined time ΔT4. The predetermined time ΔT4 is significantly longer than the above-described predetermined time ΔT, and in Example 2, as an example, corresponds to a time of the radar warning condition establishment state. In a state in which the arbitration flag described below by the warning arbitration unit 428 is "1", the fourth warning output unit 424 brings the fourth predetermined warning display and the fourth predetermined warning sound into a stop state regardless of the state of the radar flag.

Figure 12C:
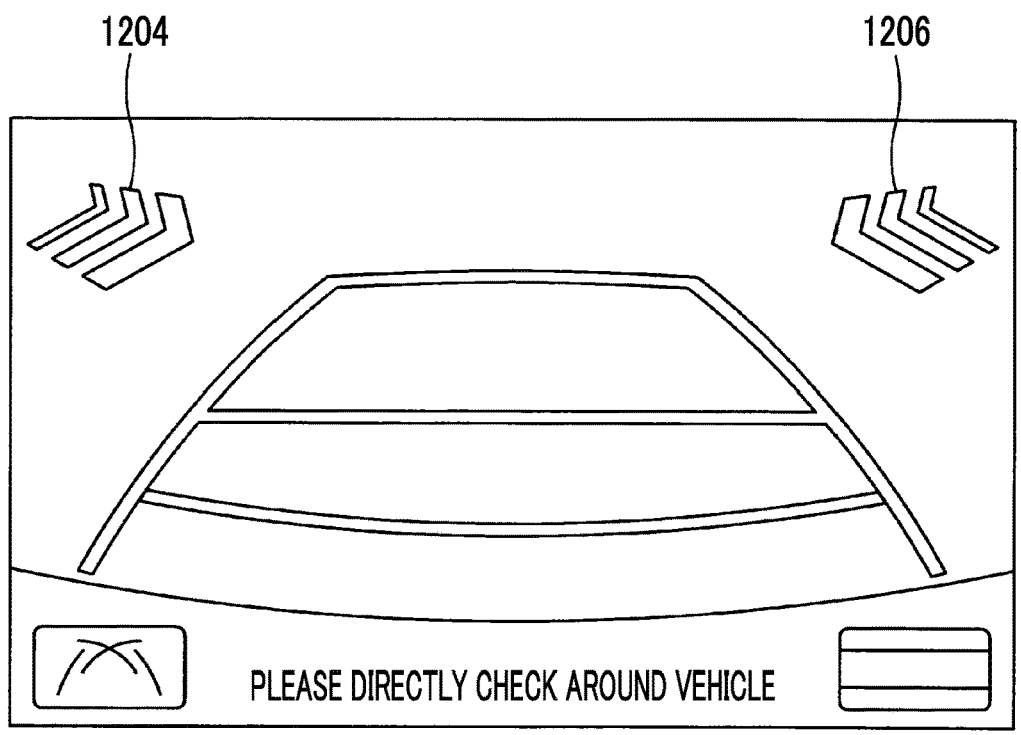
FIG. 12C is an explanatory view of fourth predetermined warning display.

The fourth predetermined warning display is, for example, predetermined display (not shown) that is output to a side mirror or predetermined display that is superimposed on the host vehicle rear image of the display 83 as shown in FIG. 12C. In an example shown in FIG. 12C, the fourth predetermined warning display includes displays 1204, 1206 that reminds entrance from the right and left, and the display 1204 or 1206 is superimposed according to the moving direction of the moving obstacle. The fourth predetermined warning sound is output through the sound output device 80. Similarly to the predetermined warning sound, the fourth predetermined warning sound is, for example, warning sound, such as "beep beep beep". In the output state of the fourth predetermined warning sound, sound "beep beep beep" is output at every predetermined interval Δp4. The predetermined interval Δp4 may be constant or may be variable. For example, the predetermined interval Δp4 may be shortened with the lapse of time. The fourth warning output unit 424 may be configured not to output the fourth predetermined warning display. In Example 2, as an example, it is assumed that the fourth warning output unit 424 is configured not to output the fourth predetermined warning display.

Figure 13:
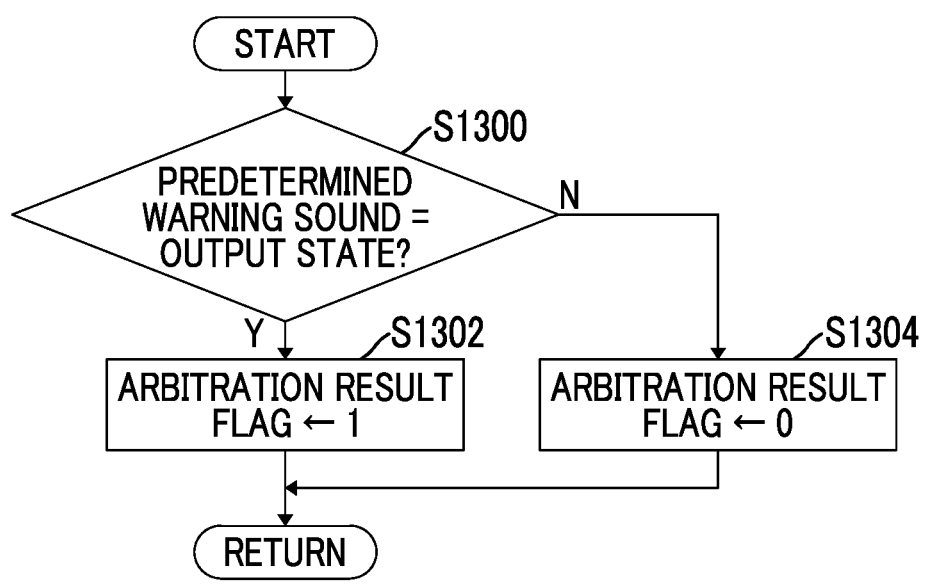
FIG. 13 is a schematic flowchart showing an example of processing that is performed by a warning arbitration unit.

FIG. 13 is a schematic flowchart showing an example of arbitration processing that is performed by the warning arbitration unit 428.

In a case where the predetermined warning sound by one of the first warning output unit 421 and the second warning output unit 422 is in the output state ("YES" in Step S1300), the warning arbitration unit 428 sets an arbitration result flag to "1" (Step S1302). In a case where the predetermined warning sound by one of the first warning output unit 421 and the second warning output unit 422 is not in the output state ("NO" in Step S1300), the warning arbitration unit 428 sets the arbitration result flag to "0" (Step S1304).

In this way, in the output state of the predetermined warning sound by one of the first warning output unit 421 and the second warning output unit 422, the warning arbitration unit 428 inhibits bringing both of the third predetermined warning sound and the fourth predetermined warning sound into the output state.

Figure 14:
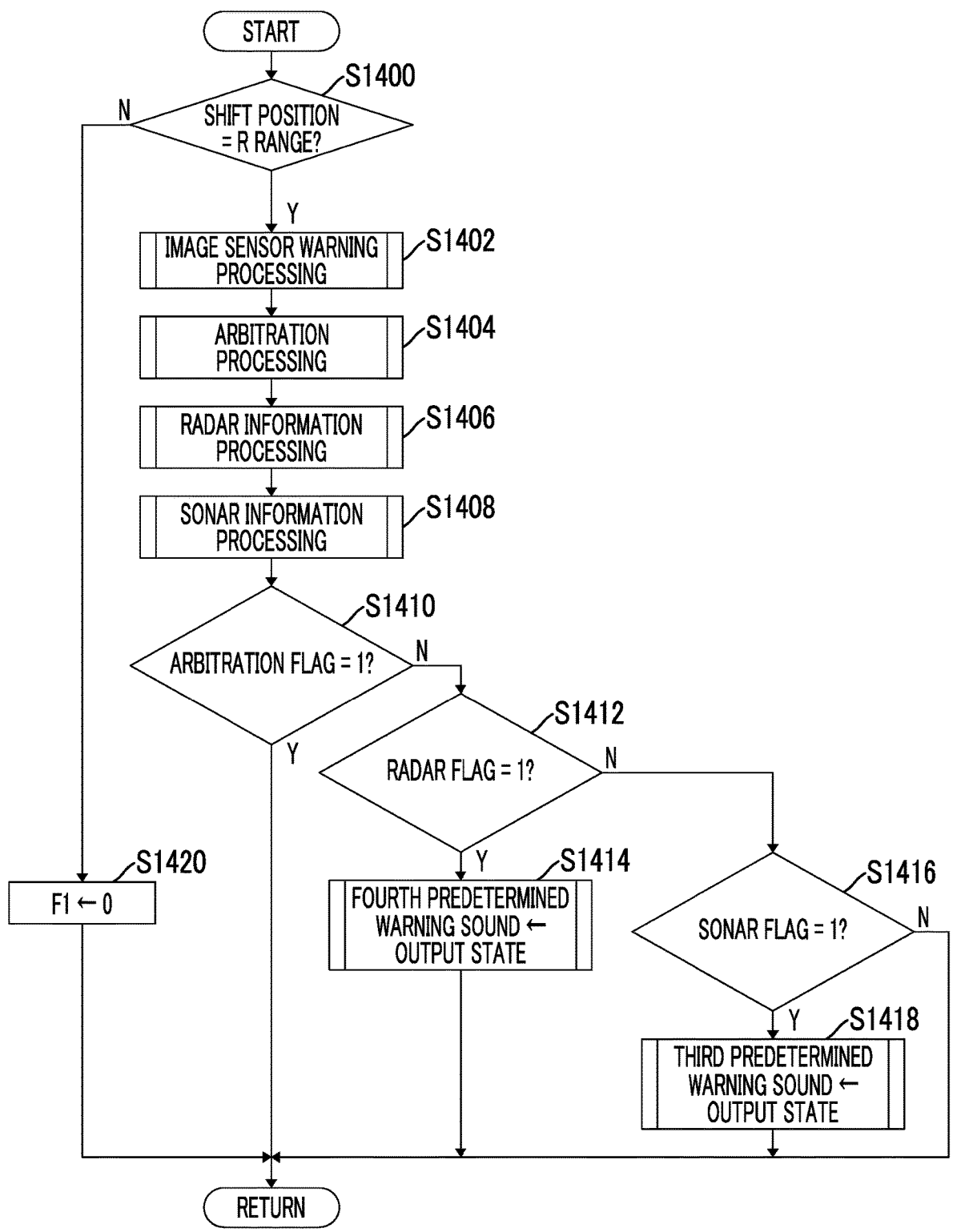
FIG. 14 is a schematic flowchart showing an overall operation example of the control device.

FIG. 14 is a schematic flowchart showing an overall operation example of the control device 40A.

In Step S1400, the warning output unit 42A determines whether or not the shift position is the R range. In a case where the determination result is "YES", the process progresses to Step S1402, and otherwise, the process progresses to Step S1420.

In Step S1402, the first warning output unit 421 and the second warning output unit 422 perform image sensor warning processing. The image sensor warning processing is different from that shown in FIG. 4 in the following points. That is, though not shown, Steps S400 and S440 are eliminated, and in Step S412, in addition to that the warning output unit 42A sets the control flag F1 to "1", the warning output unit 42A maintains the third predetermined warning sound and the fourth predetermined warning sound to the stop state or makes the third predetermined warning sound and the fourth predetermined warning sound transition to the stop state.

In Step S1404, the warning arbitration unit 428 performs arbitration processing. The arbitration processing is as shown in FIG. 13.

In Step S1406, the radar information processing unit 44 performs the radar information processing based on the radar information. The radar information processing is as shown in FIG. 11.

In Step S1408, the sonar information processing unit 43 performs the sonar information processing based on the sonar information. The sonar information processing is as shown in FIG. 10.

In Step S1410, the radar information processing unit 44 determines whether or not the arbitration flag is "1". In a case where the determination result is "YES", the processing in the present cycle ends as it is, and otherwise, the process progresses to Step S1412.

In Step S1412, the fourth warning output unit 424 determines whether or not the radar flag is "1". In a case where the determination result is "YES", the process progresses to Step S1414, and otherwise, the process progresses to Step S1416.

In Step S1414, the fourth warning output unit 424 brings a state of outputting the fourth predetermined warning sound.

In Step S1416, the third warning output unit 423 determines whether or not the sonar flag is "1". In a case where the determination result is "YES", the process progresses to Step S1418, and otherwise, the processing in the present cycle ends as it is.

In Step S1418, the third warning output unit 423 brings a state of outputting the third predetermined warning sound.

In Step S1420, the warning output unit 42A resets the control flag F1 to "0" or maintains the control flag F1 to "0". The control flag F1 is as described above referring to FIG. 4, and is related to the processing of Step S1402.

With the processing shown in FIG. 14, in the output state of the predetermined warning sound by one of the first warning output unit 421 and the second warning output unit 422, bringing both of the third predetermined warning sound and the fourth predetermined warning sound into the output state is inhibited. With this, it is possible to realize a warning with priority on safety of a person behind the host vehicle, while adding a new warning function by the third warning output unit 423 and the fourth warning output unit 424.

With the processing shown in FIG. 14, in a case where the predetermined warning sound by one of the first warning output unit 421 and the second warning output unit 422 is in the output state, the warning arbitration unit 428 sets the arbitration result flag to "1". Accordingly, in a case where the sonar flag or the radar flag is "1" when the predetermined warning sound transitions to the stop state, the arbitration flag is reset to "0" (see FIG. 13), whereby the third predetermined warning sound or the fourth predetermined warning sound by the third warning output unit 423 or the fourth warning output unit 424 is brought in to the output state. Accordingly, for example, as described above, in the second state, while the output state of the second predetermined warning sound is released after the predetermined time ΔT elapses and transitions to the stop state, at this time, for example, in a case where the radar flag is "1", the fourth predetermined warning sound is brought into the output state. In this case, in a case where the second predetermined warning sound and the fourth predetermined warning sound are the same sound ("beep beep beep"), transition from the second predetermined warning sound to the fourth predetermined warning sound is not perceived by the user.

In the processing shown in FIG. 14, the fourth predetermined warning sound is given priority over the third predetermined warning sound; however, the disclosure is not limited thereto. For example, a set of Steps S1412 and S1414 may be replaced with a set of Steps S1416 and S1418.

With the warning output device 1A of Example 2, the first warning output unit 421 and the second warning output unit 422 are provided, whereby the same effects as in Example 1 described above are obtained.

With the warning output device 1A of Example 2, in a case where a warning request (a state in which the sonar flag or the radar flag is "1") based on respective information from the clearance sonars 86 or the radar sensor 87 and the output state of the predetermined warning sound by one of the first warning output unit 421 and the second warning output unit 422 conflict, the output state of the predetermined warning sound by one of the first warning output unit 421 and the second warning output unit 422 can be given with priority. This is because it is useful to inform the occupant of the presence of a person from a viewpoint of safety of a pedestrian. With this, even under a situation in which a person and an obstacle other than a person are simultaneously detected based on different kinds of sensor information, it is possible to realize a warning form focused on safety of a person behind the host vehicle.

In Example 2, the sound output device 80 is used in common among the first warning output unit 421, the second warning output unit 422, the third warning output unit 423, and the fourth warning output unit 424; however, the disclosure is not limited thereto. For example, as a first modification example, in a case where the sound output device 80 includes different sound output devices of a first sound output device and a second sound output device, the first warning output unit 421, the second warning output unit 422, and the fourth warning output unit 424 may output the predetermined warning sound and the fourth predetermined warning sound through the first sound output device, and the third warning output unit 423 may output the third predetermined warning sound through the second sound output device. In this case, for example, the predetermined warning sound and the fourth predetermined warning sound are the same sound ("beep beep beep"), and the third predetermined warning sound is sound (for example, continuous sound "beep" other than "beep beep beep") different from the predetermined warning sound. In this case, the user can determine a warning type (between a warning based on the clearance sonars 86 and another warning) based on the difference of sound. In the first modification example, as another modification example, in the processing shown in FIG. 14, Steps S1408, S1416, and S1418 may be eliminated, and when the shift position is the R range, the processing corresponding to Steps S1408, S1416, and S1418 may be performed independently of the processing shown in FIG. 14 (without depending on the state of the control flag F1). In this case, there may be a case where the third predetermined warning sound becomes in the output state simultaneously with the predetermined warning sound and the fourth predetermined warning sound.

As a second modification example, in a case where the sound output device 80 includes different sound output devices of a first sound output device, a second sound output device, and a third sound output device, the first warning output unit 421 and the second warning output unit 422 may output the predetermined warning sound through the first sound output device, the third warning output unit 423 may output the third predetermined warning sound through the second sound output device, and the fourth warning output unit 424 may output the fourth predetermined warning sound through the third sound output device. In the second modification example, in the processing shown in FIG. 14, a set of Steps S1412 and S1414 and a set of Steps S1416 and S1418 may be performed in parallel in a case where the determination result of Step S1410 is "NO". In this case, there may be a case where the third predetermined warning sound becomes in the output state simultaneously with the fourth predetermined warning sound. Alternatively, in the second modification example, as another modification example, the warning arbitration unit 428 may be omitted. In this case, in the processing shown in FIG. 14, Steps S1404 and S1410 are eliminated, and a set of Steps S1412 and S1414 and a set of Steps S1416 and S1418 may be performed independently. In this case, the third predetermined warning sound and the fourth predetermined warning sound may be sound (for example, sound other than "beep beep beep", and continuous sound "beep") different from the predetermined warning sound by the first warning output unit 421 and the second warning output unit 422. In this case, the user can determine a warning type based on the difference of sound. In this case, the third predetermined warning sound and the fourth predetermined warning sound may be sound different from each other.

In Example 2, although both of the clearance sonars 86 and the radar sensor 87 are used, one of the clearance sonars 86 and the radar sensor 87 may be used. For example, in a case where solely the clearance sonar 86 is used, the radar information processing unit 44 and the fourth warning output unit 424 are not needed, and in the processing shown in FIG. 14, Steps S1406, S1412, and S1414 are eliminated. In a case where solely the radar sensor 87 is used, the sonar information processing unit 43 and the third warning output unit 423 are not needed, and in the processing shown in FIG. 14, Steps S1408, S1416, and S1418 are eliminated.

In Example 2, the third warning output unit 423 and the fourth warning output unit 424 output the third predetermined warning sound and the fourth predetermined warning sound depending on the state of the arbitration flag, respectively; however, the disclosure is not limited thereto. For example, solely the fourth warning output unit 424 of the third warning output unit 423 and the fourth warning output unit 424 may output the fourth predetermined warning sound depending on the state of the arbitration flag. In this case, there may be a case where the sound output device 80 includes two or more different sound output devices, and the third predetermined warning sound becomes the output state simultaneously with the predetermined warning sound by one of the first warning output unit 421 and the second warning output unit 422. In this case, the third predetermined warning sound may be sound (for example, sound other than "beep beep beep", and continuous sound "beep") different from the predetermined warning sound by the first warning output unit 421 and the second warning output unit 422. In this case, the user can determine a warning type based on the difference of sound.

In Example 2, as described above, as an example, the third warning output unit 423 does not output the third predetermined warning display, and the fourth warning output unit 424 does not output the fourth predetermined warning display; however, the disclosure is not limited thereto. For example, the third warning output unit 423 may output the third predetermined warning display in synchronization with the third predetermined warning sound or may output the third predetermined warning display in a state in which the sonar flag is "1", without depending on the state of the arbitration flag. Similarly, the fourth warning output unit 424 may output the fourth predetermined warning display in synchronization with the fourth predetermined warning sound or may output the fourth predetermined warning display in a state in which the radar flag is "1", without depending on the state of the arbitration flag.

In Example 2, as described above, as an example, in a case where the predetermined warning sound by one of the first warning output unit 421 and the second warning output unit 422 is in the output state, the warning arbitration unit 428 sets the arbitration result flag to "1"; however, the disclosure is not limited thereto. For example, in a case where the predetermined warning display by one of the first warning output unit 421 and the second warning output unit 422 is in the output state, the warning arbitration unit 428 may set the arbitration result flag to "1".

In Example 2 described above, a state in which the shift position is the R range and the radar flag is "1" is an example of a "fourth state".

Although the examples have been described in detail, the disclosure is not limited to a specific example, and various modifications and changes may be made without departing from the scope of the disclosure. In addition, all or a plurality of constituent elements of the examples described above may be combined.

For example, in Example 1 described above, an obstacle to be detected by the warning output unit 42 is a person; however, the disclosure is not limited thereto. For example, an obstacle to be detected by the warning output unit 42 may be an obstacle (wall, another vehicle, or the like) other than a person instead of or in addition to a person. In this case, predetermined warning display or predetermined warning sound is output in the same form by the first warning output unit 421 and the second warning output unit 422 with respect to an obstacle other than a person.

What is claimed is:

1. A warning output device comprising:
   a sensor unit configured to detect a first obstacle behind a host vehicle; and
   an electronic control unit configured to:
      when a shift position is an R range, output a warning for informing an occupant of the presence of the first obstacle based on information from the sensor unit indicating that the first obstacle is detected;
      in a first state in which the first obstacle is present within a first predetermined area behind the host vehicle, output first predetermined warning display and first predetermined warning sound; and
      in a vehicle stop state and a second state in which the first obstacle is not present within the first predetermined area and the first obstacle is present within a second predetermined area behind the host vehicle farther from the host vehicle than the first predetermined area, output second predetermined warning display and second predetermined warning sound,
   wherein the electronic control unit is configured to, in the second state, output the second predetermined warning sound for a predetermined time, then stop the output of the second predetermined warning sound, and
   output the second predetermined warning display for a longer time than the second predetermined warning sound,
   wherein the first obstacle is a person, and
   the warning output device, further comprising:
      an ultrasonic sensor unit configured to detect a predetermined obstacle including a second obstacle other than a person behind the host vehicle using an ultrasonic wave wherein the sensor unit includes an image sensor, and
   the electronic control unit is further configured to:
      in a state in which the shift position is the R range and the predetermined obstacle is detected by the ultrasonic sensor unit, output third predetermined warning sound, and
      in a case where either of the first predetermined warning sound or the second predetermined warning sound is an output state, inhibit outputting the third predetermined warning sound.

2. The warning output device according to claim 1, wherein the electronic control unit is further configured to predict whether or not the first obstacle enters the first predetermined area, and in a case where prediction is made that the first obstacle enters the first predetermined area, output the first predetermined warning display and the first predetermined warning sound.

3. The warning output device according to claim 1, wherein the electronic control unit is configured to, in the first state, output the first predetermined warning display and the first predetermined warning sound regardless of the vehicle stop state and a vehicle non-stop state.

4. The warning output device according to claim 1, wherein the electronic control unit is further configured to, in a vehicle non-stop state and a third state in which the first obstacle is present within the second predetermined area, output the first predetermined warning display and the first predetermined warning sound.

5. A warning output device comprising:
   a sensor unit configured to detect a first obstacle behind a host vehicle; and
   an electronic control unit configured to:
      when a shift position is an R range, output a warning for informing an occupant of the presence of the first obstacle based on information from the sensor unit indicating that the first obstacle is detected;
      in a first state in which the first obstacle is present within a first predetermined area behind the host vehicle, output first predetermined warning display and first predetermined warning sound; and
      in a vehicle stop state and a second state in which the first obstacle is not present within the first predetermined area and the first obstacle is present within a second predetermined area behind the host vehicle farther from the host vehicle than the first predetermined area, output second predetermined warning display and second predetermined warning sound,
   wherein the electronic control unit is configured to, in the second state, output the second predetermined warning sound for a predetermined time, then stop the output of the second predetermined warning sound, and
   output the second predetermined warning display for a longer time than the second predetermined warning sound, and
   wherein the first obstacle is a person,
   the warning output device further comprising:
      a radar sensor unit configured to detect a third obstacle that is a moving object other than a person behind the host vehicle and is equal to or greater than a predetermined physique wherein the sensor unit include an image sensor, and
   the electronic control unit is further configured to:
      in a fourth state in which the shift position is the R range and a cross point position of an extension line of a moving direction of the host vehicle and an extension line of a moving direction of the third obstacle is within a predetermined distance with respect to a host vehicle position, output fourth predetermined warning sound, and
      in the second state and the fourth state, output the fourth predetermined warning sound after the stop of the second predetermined warning sound with lapse of the predetermined time.

6. The warning output device according to claim 5, wherein the electronic control unit is further configured to predict whether or not the first obstacle enters the first predetermined area, and in a case where prediction is made that the first obstacle enters the first predetermined area, output the first predetermined warning display and the first predetermined warning sound.

7. The warning output device according to claim 5, wherein the electronic control unit is configured to, in the first state, output the first predetermined warning display and the first predetermined warning sound regardless of the vehicle stop state and a vehicle non-stop state.

8. The warning output device according to claim 5, wherein the electronic control unit is further configured to, in a vehicle non-stop state and a third state in which the first obstacle is present within the second predetermined area, output the first predetermined warning display and the first predetermined warning sound.

* * * * *